United States Patent [19]

Schmidt

[11] 3,893,182

[45] July 1, 1975

[54] INFORMATION CARD TRANSPORT, RECORDING AND READOUT MECHANISM

[75] Inventor: Josef Schmidt, Chicago, Ill.

[73] Assignee: Bell & Howell Company, Chicago, Ill.

[22] Filed: Feb. 8, 1974

[21] Appl. No.: 440,600

Related U.S. Application Data

[62] Division of Ser. No. 367,513, June 6, 1973, Pat. No. 3,869,718.

[52] U.S. Cl. ............... 360/88; 235/61.12 M; 360/2; 360/71

[51] Int. Cl. ...................... G11b 15/04; G11b 25/04

[58] Field of Search ............ 360/88, 60, 71, 72, 74, 360/2, 101, 130; 235/61.11 D, 61.12 M; 35/35 C

[56] References Cited

UNITED STATES PATENTS

| | | | |
|---|---|---|---|
| 3,404,894 | 10/1968 | Kral | 360/2 |
| 3,712,973 | 1/1973 | Kral | 360/88 |
| 3,731,006 | 5/1973 | Streiffert et al. | 360/88 |
| 3,760,391 | 9/1973 | Wolf et al. | 360/88 |
| 3,780,264 | 12/1973 | Kondur et al. | 235/61.12 M |

*Primary Examiner*—Alfred H. Eddleman
*Attorney, Agent, or Firm*—Roger M. Fitz-Gerald; John R. Hoffman; Louis A. Hecht

[57] ABSTRACT

An apparatus for handling a vertically oriented record card carrying a magnetic stripe having an "instructor" track and a "student" track, for transport of the card across a transducer head. A transducer head blocking lever is included which yields in one direction to permit normal movement of the card along a guide track across the transducer head, but prevents engagement of the card with the head when the card is attempted to be inserted into the track in a direction perpendicular to the normal path of movement of the card along the track. The apparatus also is adapted to selectively preclude accidental recording by a student upon the instructor track of the record card. Accordingly, the apparatus is provided with an interlock between the transducer head and the recording actuator to permit recording on the "student" track but to prevent recording on the record card when the transducer head is positioned at the "instructor" track, and an override feature serving to disable the interlock.

8 Claims, 5 Drawing Figures

INFORMATION CARD TRANSPORT, RECORDING AND READOUT MECHANISM

This is a division of application Ser. No. 367,513, filed June 6, 1973, now U.S. Pat. No. 3,869,718.

BACKGROUND OF THE INVENTION

1. Field of the Invention

This invention relates to an apparatus for transporting and processing magnetically striped record cards and more particularly relates to such an apparatus including improved control features.

2. Brief Description of the Prior Art

Card handling mechanisms to which the instant invention relates generally provide a track adapted for advancement of a vertically oriented magnetically striped record card generally along the plane of the card. The record card is carried from an entrance station to an exit station with the magnetic stripe on the card being drawn across a transducer head for recording or for playback. Sound indicia are carried in the form of a magnetic band which extends along the path of card movement.

Record cards are frequently used for educational purposes, often for teaching languages by phonetics. In connection with such use, the magnetic band is of sufficient width to define two discrete recording paths or tracks generally designated as the "student" and "instructor" tracks. In this manner, phonetic attempts made by a student can be readily compared with the instructor pronunciations and compared with written indicia displayed upon the face of the record card.

In use, the student is provided with a set of rectangular cards, each of which carries a magnetic stripe prerecorded with the instructor's message. The magnetic stripe is of sufficient width to define an additional student track to be recorded with the student attempts alongside the instructor track. The cards also may carry a printed message corresponding to the instructor's verbal message.

In using the record cards, the student places a card in the guide track of the unit and the card is engaged by a drive roller or capstan and drawn across a pivotally mounted transducer head. To prevent damage to the transducer head, the card should be firmly seated on the bottom of the guide track before it engages the transducer head so that the deflective force on the head produced by the card is about the head pivot axis, rather than in another non-yielding direction which may result in damage to the head.

Additionally, sometimes a student, by accident, overrecords upon the instructor's track and thereby obliterates the instructor's message. One prior machine has overcome this problem by totally eliminating the ability of the student's machine to record upon the instructor track with the result that even the instructor cannot use the student's machine for on-the-spot recording. Another machine uses a relatively complicated and costly interlock mechanism between a card positioning system and the recording actuator.

SUMMARY OF THE INVENTION

The present invention provides an information card transport mechanism for audio readout. The mechanism or machine is designed for handling a substrate such as a record card which carries an elongate magnetic media stripe accommodating more than one recording track, i.e., usually an "instructor" recording track and a "student" recording track. The machine moves the record card across a transducer head for performing recording and playback functions using the stripe of magnetic media.

Using the machine of the present invention, an operator can select either the recording or playback function and can also select either a first or second recording track, e.g., the student or instructor track. The transducer head is movable to record on or play from the selected track on the record card. However, the machine is provided with means which prevents actuation of the recording function while the transducer head is at a predetermined one of the tracks, e.g., corresponding to the instructor track. In an advantageous form of the machine, the operator (instructor) can override the prevent means for the purpose of recording on the instructor track.

In one form of the invention, both the prevent and override means depend on actuation and deactuation of a common lost motion connection which permits or prevents actuation of the recording function. The prevent means is operated in direct response to operation of the transducer head track selector, and the override means is operated responsive to a separate control which is hidden or reasonably unaccessible to the student during use of the machine.

The apparatus has a guide track through which the record card is moved on a support base to engage the transducer head. Lateral entry of the substrate into the guide track, which could damage the transducer head, is blocked by a blocking member in the path of the track which engages the record card before it can be laterally engaged with the transducer head. The invention further provides a significant improvement in such a blocking system by mounting the blocking system for movement out of the guide track responsive to movement of the record card along the guide track. This is readily accomplished by providing a camming surface on the blocking member facing the entry end of the guide track. If the card is positioned properly in the track, the camming surface is engaged thereby and the blocking member is readily moved out of the track. If the card is attempted to be inserted into the track perpendicular to the path of movement of the card, i.e., away from the camming surface, the blocking member is immovable and prevents entry of the card into the track.

The machine also has a motor system for driving the record card along the guide track, and a motor switch can be actuated by movement of the blocking member each time a record card is properly placed in the guide track and moved to engage the camming surface. In such a system the motor would be positioned beyond the blocking member and the record card correspondingly would have to be moved beyond the blocking member before contact with the motor means.

While this invention is susceptible of embodiment in many different forms, there is shown in the drawings and will herein be described in detail a specific embodiment thereof, with the understanding that the present disclosure is to be considered as an exemplification of the principles of the invention and is not intended to limit the invention to the embodiment illustrated.

DESCRIPTION OF THE PREFERRED EMBODIMENT

Figures 1, 2:
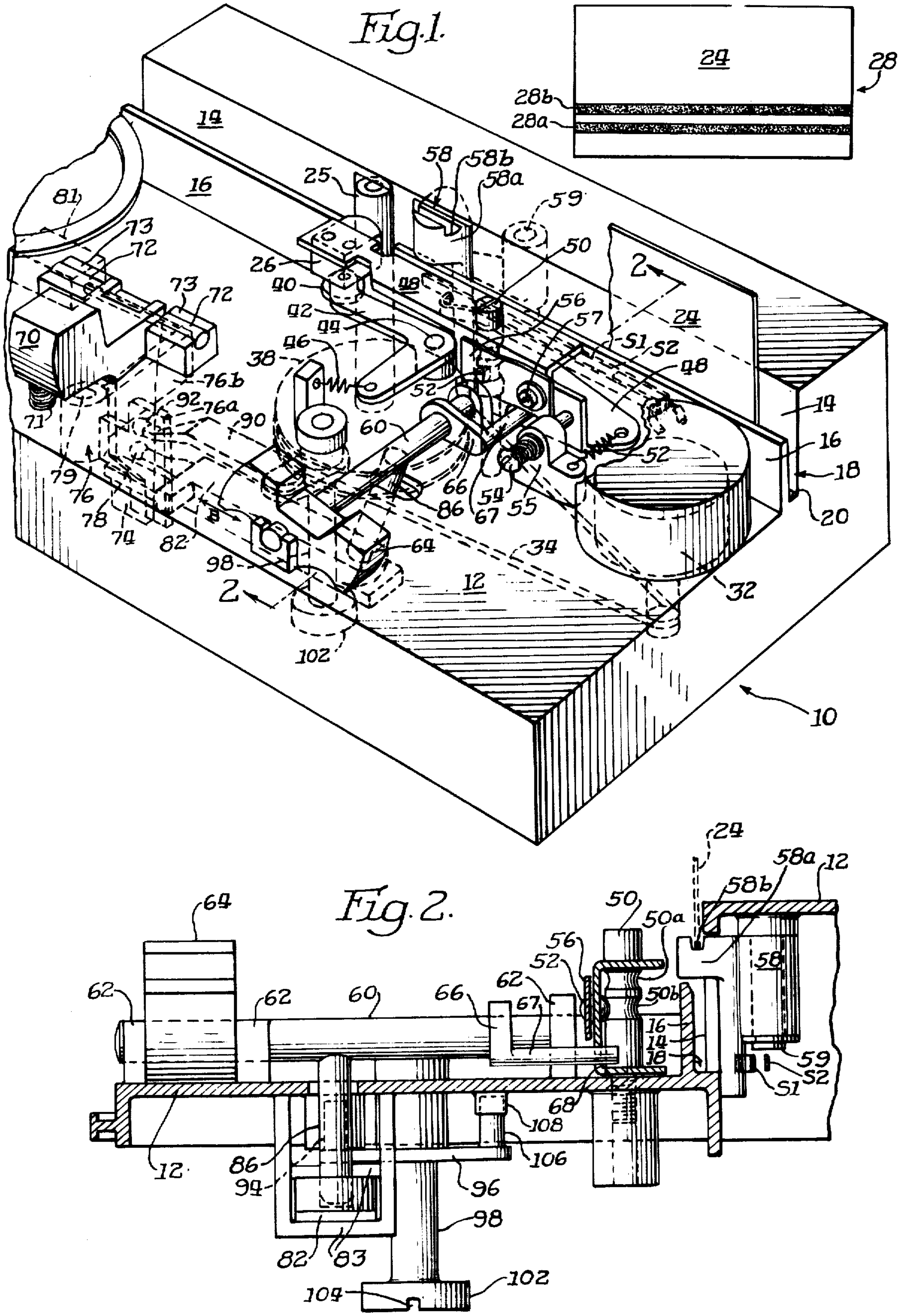
FIG. 1 is a perspective view of a machine constituting a form of the present invention.
FIG. 2 is a fragmentary vertical section taken generally along line 2—2 of FIG. 1.

Referring to FIG. 1, an information card transport and audio recording and readout mechanism is designated generally by reference numeral 10. The mechanism illustrated is particularly adapted for educational uses, e.g., the teaching of languages by phonetics, and can receive conventional magnetically striped record cards for such purposes. Accordingly, guide track and motor systems are provided for moving the cards through the machine while the cards are vertically disposed. A frame 12 of mechanism 10 is provided with a vertical wall 14 and a spaced vertical flange 16 which extends the length of wall 14 and is parallel thereto defining a U-shaped card receiving channel 18 having a bottom or base portion 20 between flange 16 and wall 14.

Record cards are inserted at the righthand portion of the channel 18 as shown by the position of card 24 in FIG. 1. A feed roller or capstan 25 is located immediately adjacent and slightly projecting into the card guide path of channel 18, at wall 14, to engage and transport a card past a transducer head 26.

The transducer head 26 is a recording and reproducing head and is connected to known recording and reproducing circuitry so that audio information can be recorded on and reproduced from a magnetic media stripe, generally designated 28, of a known material applied to card 24 in a known manner.

When card 24 is introduced into the channel 18, the card 24 is then slid to the left as viewed in FIG. 1 into engagement with capstan 25 which moves the card past the transducer head 26 at a constant or uniform predetermined rate. The capstan 25 is powered by a motor 32 which drives a belt 34. Belt 34 is wrapped around a pulley 38 to which the capstan 25 is secured for rotation therewith. The capstan 25 opposes a backup roller 40 mounted on an arm of a lever 42 for free rotation. Lever 42 is pivotally mounted on pin 44 and the other arm of lever 42 is grounded to a lug on frame 12 by tension spring 46 which biases backup roller 40 against capstan 25.

The transducer head 26 is mounted and maintained in recording and/or playback association with the magnetic media of record card 24 as the record card is moved through the channel 18. Accordingly, transducer head 26 is secured to a bracket 48 which is mounted for pivotal movement on a vertical post 50 and is normally urged by spring 52 toward capstan 25. The transducer head 26 is spaced a proper distance from capstan 25 by a screw stop 54 which is threaded through a frame member 55 against bracket 48 to establish the position of proper spacing between transducer 26 and capstan 25. The spacing between the transducer head and capstan can be adjusted as required or desired by adjusting the screw stop 54.

Means also is provided mounting the transducer head 26 for vertical movement between vertically spaced parallel recording tracks of magnetic media 28. Accordingly, bracket 48 is axially slidable on post 50 between two vertical spaced detent positions. Post 50 is provided with two spaced annular grooves at 50*a* and 50*b* (FIG. 2) which are detented by a ball 52 urged inwardly by a leaf spring 56 secured or grounded to bracket 48 by a pin 57. Thus, bracket 48 and transducer head 26 can be positioned in either detent position simply by moving bracket 48 between the vertically spaced positions on post 50 defined by grooves 50*a* and 50*b*.

Figures 3, 4, 5:
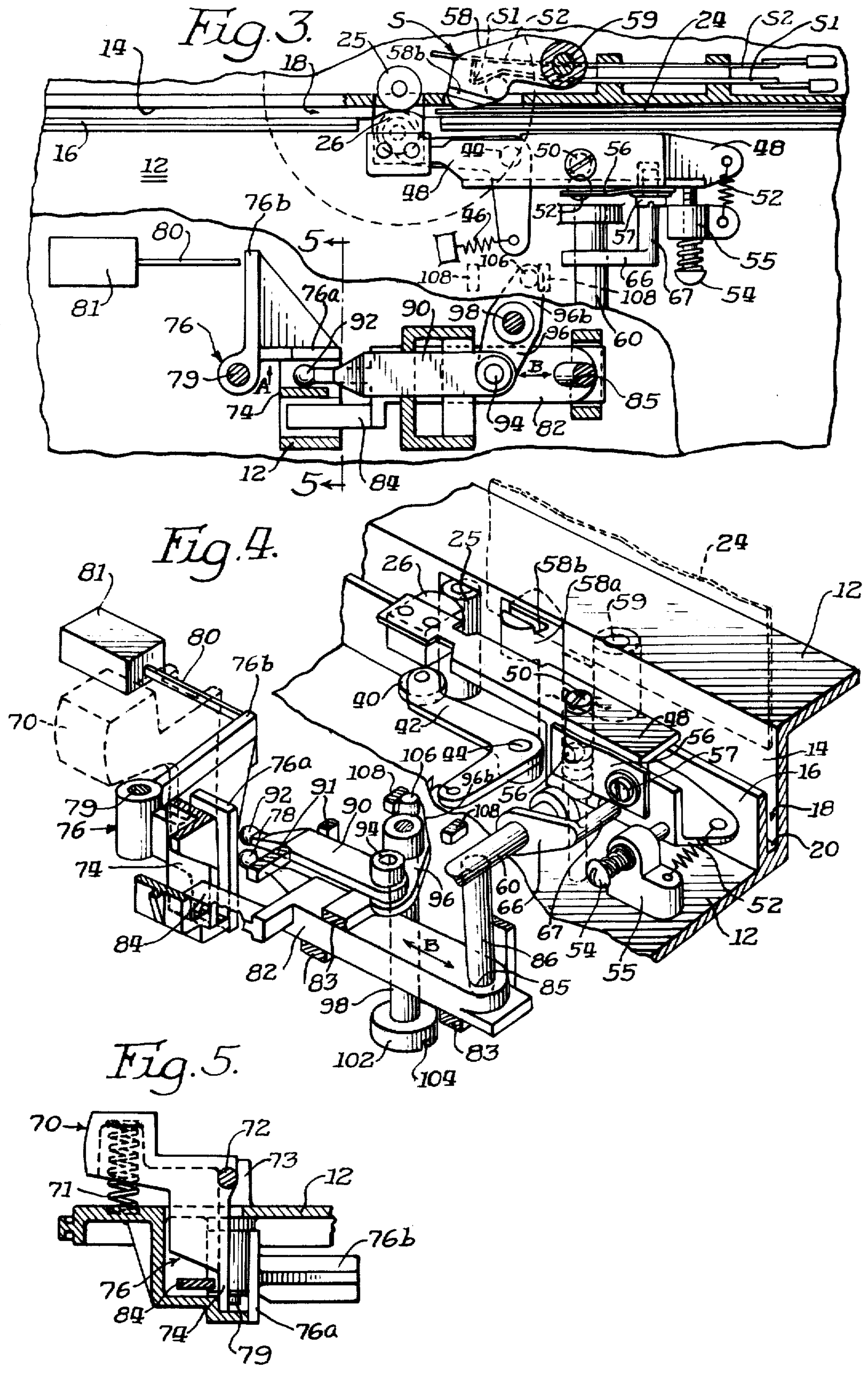
FIG. 3 is a fragmentary plan view of the machine of FIG. 1.
FIG. 4 is a fragmentary perspective view further illustrating that portion of the machine which is shown in FIG. 3.
FIG. 5 is a fragmentary vertical section taken generally along the line 5—5 of FIG. 3.

It is not necessary that motor 32 continuously drive capstan 25 unless a card is inserted in the machine for recording or readout purposes. Thus, a system is provided for actuating motor 32 only when a card is being delivered toward capstan 25 for use by the machine. If card 24 is moved from the position shown in FIG. 1 toward capstan 25 it engages a switch finger or actuator 58 at a rounded camming surface 58*a*. Actuator 58 is pivotally mounted at 59 (FIGS. 2 and 3) and pivots clockwise as seen in FIG. 3 under the urging of the leading edge of a card 24. Actuator 58, when pivoted, closes a switch, generally designated S, by moving a resilient switch contact S1 into engagement with a second contact S2. Closing switch S starts motor 32. As card 24 is moved further through channel 18 into engagement with capstan 25, the capstan now will be rotating by motor 32 to deliver card 24 at the proper speed past transducer head 26. Once the card has been delivered past the transducer head, the resilient contact S1 spring returns actuator 58 to its protruding position into channel 18, as shown in FIG. 1.

In order to protect transducer head 26 from damage by improper vertical insertion of a record card against the transducer head or vertically between the head and capstan 25, blocking means is provided for preventing or deterring such insertion. The protruding portion of actuator 58 completely traverses the top opening of channel 18 and has an upper channel shaped stop surface means 58*b* (FIG. 2). If one attempts to insert a card vertically into channel 18, the blocking channel 58*b* interferes and stops the card. Since the card can be inserted into channel 18 only to the right of actuator 58, as seen in FIG. 1, and move it to the left into engagement with capstan 25, the blocking channel 58*b* acts as a deterrent to improper use of the machine which might damage the transducer head.

Manually operable means are provided for moving the transducer head between separate vertically spaced parallel recording or playback tracks on stripe 28, e.g., between a student track 28*a* and an instructor track 28*b*. Referring to FIGS. 1 and 2, a horizontal shaft 60 is rotatably journalled in trunnions 62. Shaft 60 is integrally secured near its forward end to a rocker button 64 and near its rearward end to an integral crank element 66. Crank 66 has a rearwardly extending arm 67 received in an opening 68 in bracket 48. Rocker button 64 can be moved between a position having the righthand side thereof depressed as shown in FIG. 1 and a second position having its lefthand side depressed. With the righthand side of rocker button 64 depressed, the bracket 48 is in a position with detent ball 52 disposed in the lower detent groove 50*b* (FIG. 2). This positions the transducer head 26 in its lower position as shown in FIG. 1 for operative engagement with the lower track portion 28*a* of the magnetic stripe 28 on card 24. When the rocker button 64 is depressed to the left, crank element 66 is pivoted to raise bracket 48 to the position shown in FIG. 4 with the detent ball 52 disposed in the upper annular detent groove 50*a* and the transducer head in its upper position (FIG. 4) for operative engagement with the lower track portion 28*b* of the magnetic stripe 28 on card 24. If rocker button 64 is again depressed to the right, crank element 66 moves bracket 48 back to the lower detent position.

The mechanism is also provided with a switch button 70 for selecting either the recording or playback function. In the normally raised position of button 70 the device is adapted to perform the playback function. Depressing button 70 shifts the device into the recording function. A spring 71, beneath button 70, biases the button toward its normally raised position. Button 70 is pivotally mounted to frame 12 by laterally extending pins 72 snap fit in ear mounts 73. A flange 74 extends downwardly from button 70 through an opening in the deck of frame 12 to a position below the deck. When button 70 is depressed, flange 74 pivots about pins 72 and moves in a rearward position as seen in FIG. 1 (see arrow A, FIG. 3) toward one arm portion 76*a* of a switch crank, generally designated 76. The flange 74 may strike an interposer member 78 and bias member 78 into engagement with arm 76*a* to pivot switch crank 76 about a pivot pin 79. A second arm 76*b* of switch crank 76 then strikes and triggers an outwardly spring loaded switch arm 80 of a switch 81 which actuates the recording circuitry. Upon release of button 70, spring 71 returns button 70 to its raised position and returns flange 74 forwardly. Crank 76 is returned to its normal playback position, as seen in FIG. 3, by the spring loaded switch arm 80.

An interlock system is provided to prevent actuation of the recording switch 81 while the transducer head 26 is in its raised position for tracking the instructor's track to prevent the student from erasing and recording over the instructor's track. Accordingly, the interposer member 78 is carried by a slide 82 which is supported and mounted for longitudinal sliding movement in the direction of double-headed arrows B, in suitable bracket portions 83 of frame 12. Slide 82 also carries at one end a guide element 84 (FIG. 3) generally parallel to the interposer element 78. At its other end, slide 82 is provided with an elongated receiver hole 85 for receiving the end of an arm 86 which extends upwardly and is secured at its upper end to shaft 60. As rocker button 64 is depressed to the left as viewed in FIG. 1, to position the transducer head 26 at the upper instructor's track position, arm 86 is pivoted counterclockwise, as seen in FIG. 1, and moves slide member 82 to the right to the position shown in FIG. 4. This movement of the slide member 82 withdraws interposer element 78 from between flange 74 and arm 76*a*. Thus, if the recording button 70 is depressed, flange 74 will be moved rearward as described above, but it will not move far enough without the interposer element 78 to engage arm 76*a* of switch crank 76 to establish triggering engagement with switch arm 80. Thus, with the transducer head 26 in raised position, the device is incapable of being placed in the recording phase.

Means also is provided for overriding the above described interlock so that the instructor's track can be used for the recording function. A second slide type interposer member 90 is mounted for sliding movement by suitable brackets 91 of frame 12, between a withdrawn position as seen in FIG. 4 and an interposing position as seen in FIG. 3 with an interposer element 92 disposed between plate 74 and arm 76*a*. Slide 90 is pivotally connected at 94 to a lever 96 (FIGS. 3 and 4) which is pivotally secured to a shaft 98 having a knob 102 with a slot 104 for receiving a screw driver or coin edge to turn knob 102. The bottom surface of knob 102 can be flush with the bottom wall of frame 12 and is intended to be used only by the instructor for recording purposes. Lever 96 carries a lug 106 on an arm 96*b* which abuts stop members 108 which define the limit positions of interposer element 92. It will be seen that turning knob 102 will move interposer element 92 between its inserted and withdrawn positions. With element 92 in its inserted position, depressing button 70 will place the device in its recording phase in the same manner as if interposer element 78 were in its inserted position.

I claim:

1. In combination with an apparatus for handling a substrate carrying an elongated magnetic media, the apparatus having a guide track through which the substrate is moved in a forward direction on a support base across and in engagement with a transducer head, the substrate being accessible to an operator while moving through the guide track, the improvement comprising:
blocking means positioned within the track at a location for engagement with the substrate prior to engagement of the substrate with the transducer head for blocking entrance of the substrate into the track laterally along a path substantially normal to its path of forward movement.

2. The apparatus of claim 1 including means actuated in response to passage of said substrate in its forward direction for removing said blocking means from the track.

3. The apparatus of claim 2 wherein said removing means is engaged by said substrate to remove the blocking means.

4. In combination with an apparatus for handling planar cards carrying an elongated magnetic media, the apparatus having a guide track defining a support base and drive means for moving the card through the guide track so as to draw the magnetic media across a transducer head in a forward direction, the improvement comprising:
blocking means positioned within the track at a location for engagement with the card prior to engagement of the card with the transducer head, said blocking means including a blocking surface at a level at least as high as the position of the transducer head above the support base, said blocking means retracting to permit passage of the card in the forward direction of movement along the track, and said blocking surface blocking entrance of the card into the track along a path substantially normal of its path of forward movement.

5. The apparatus of claim 4 wherein said blocking means comprises a member pivotally supported on an axis parallel to the plane of a card when properly traveling in a forward direction with the free end of the member positioned within said track for engagement by the card on its forward travel, said pivotally supported member being deflected by the card when said card is moved through said track.

6. The apparatus of claim 4 wherein said apparatus includes switch means for control of said drive means, and pivotally supported member serves as the actuating member for said switch means.

7. The apparatus of claim 5 wherein said pivotally supported member includes a camming surface engaged by the card when the card is moved through the track for deflecting the member.

8. The apparatus of claim 7 wherein said pivotally supported member includes a blocking surface generally transverse to said camming surface.

* * * * *